(12) United States Patent  (10) Patent No.: US 11,200,828 B2
Shih  (45) Date of Patent: Dec. 14, 2021

(54) METHOD FOR MATCHING COLOR TEMPERATURE OF DISPLAY AND SYSTEM THEREOF

(71) Applicant: REALTEK SEMICONDUCTOR CORP., Hsinchu (TW)

(72) Inventor: Chun-Yuan Shih, New Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/089,797

(22) Filed: Nov. 5, 2020

(65) Prior Publication Data
US 2021/0134209 A1   May 6, 2021

(30) Foreign Application Priority Data

Nov. 6, 2019 (TW) ................... 108140279

(51) Int. Cl.
*G06F 3/147* (2006.01)
*G09G 3/20* (2006.01)
*G06F 3/14* (2006.01)

(52) U.S. Cl.
CPC ......... *G09G 3/2003* (2013.01); *G06F 3/1423* (2013.01); *G09G 2320/0242* (2013.01); *G09G 2320/0666* (2013.01); *G09G 2320/0673* (2013.01)

(58) Field of Classification Search
CPC .... G09G 3/1423; G09G 3/2003; G09G 3/006; G09G 2300/026; G09G 2320/0242; G09G 2320/0276; G09G 2320/0666; G09G 2320/0673; G09G 2320/0693; G09G 2340/06; G09G 2360/145; G06F 3/1446; G06F 3/1423; H04N 1/6052; H04N 9/3182; H04N 9/69; H04N 9/73; G01J 3/465; G01J 3/506
See application file for complete search history.

(56) References Cited

U.S. PATENT DOCUMENTS

| 2005/0021258 A1* | 1/2005 | Fasciano | H04N 17/04 702/67 |
| 2011/0057963 A1* | 3/2011 | Lee | G09G 5/02 345/690 |
| 2014/0152706 A1* | 6/2014 | Park | H04N 1/6052 345/690 |

(Continued)

*Primary Examiner* — Michael J Eurice
(74) *Attorney, Agent, or Firm* — Li & Cai Intellectual Property (USA) Office

(57) ABSTRACT

A method for matching a color temperature of a display and a system thereof are provided. The system adopts a first color analyzer for obtaining a first regional color value for a specific area of the display, and a second color analyzer for obtaining a global color value for a whole area and a second regional color value for the specific area. While obtaining a difference between the first and second regional color values and another difference between the global color value and the second regional color value, a sum of the differences is calculated. The sum of differences and a global color target value obtained in an offline mode are referred to adjust a correction target for the specific area of the display. A new correction target can be obtained for providing display parameters of colors that are applied to the whole area of the display.

16 Claims, 5 Drawing Sheets

(56) References Cited

U.S. PATENT DOCUMENTS

| | | | |
|---|---|---|---|
| 2015/0070402 A1* | 3/2015 | Shah | G09G 3/20 |
| | | | 345/690 |
| 2015/0243251 A1* | 8/2015 | Ohnishi | G09G 5/12 |
| | | | 345/690 |
| 2016/0155389 A1* | 6/2016 | Beon | G06F 3/1446 |
| | | | 345/690 |
| 2019/0191153 A1* | 6/2019 | Speigle | G09G 5/10 |
| 2020/0082784 A1* | 3/2020 | Deng | G06T 11/001 |
| 2020/0143768 A1* | 5/2020 | Huang | G01J 3/465 |
| 2021/0043160 A1* | 2/2021 | Yamamura | H04N 9/64 |

* cited by examiner

METHOD FOR MATCHING COLOR TEMPERATURE OF DISPLAY AND SYSTEM THEREOF

CROSS-REFERENCE TO RELATED PATENT APPLICATION

This application claims the benefit of priority to Taiwan Patent Application No. 108140279, filed on Nov. 6, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to a display color correction technology, and more particularly to a method that maps various color values measured by different color analyzers to obtain a correction target for correcting a color temperature of a display and a system thereof.

BACKGROUND OF THE DISCLOSURE

The primitive colors of displays may require adjustment or tuning to become true colors through a specific machine, and the true colors are the accurate ones with respect to the human eyes. A two-dimensional (2D) color analyzer can be used for measuring the values of colors for even better correction.

Before the flat panel display is shipped, a color correction process may be performed in the factory, so that the image displayed on the display can be adjusted to be as close as possible to the true colors by referring to a CIE 1931 color space that is defined by the International Commission on Illumination (CIE). However, the conventional technologies may only calibrate a central area of the display, and color deviation may still occur at the edge outside of the display other than the central area of the display.

In an example, the method of the conventional technology determines characteristics of the central or part of the display by a color analyzer. After a target color space is determined, the characteristics of the selected area of the display can be used to correct the color parameters such as color and brightness. The target color space is such as a CIE xyY color space that can be achieved by correcting the parameters of hardware parameters including pre gamma, color transfer matrix, and post gamma. The pre gamma can be used to linearize the non-linear target color space that adopts linear coding, e.g., non-linear RGB to form the target color space linear coding, e.g., linear RGB. The linear target space allows the color transfer matrix to perform linear color space transformation. The primitive color space of the display can be transformed to the target color space via the color transfer matrix. The post gamma then outputs the color information of the display, in which the characteristics of the display are linearized. After that, when the display is shipped from the factory, the corrected color parameters can be applied to a chip that controls the display panel.

However, the conventional color analyzer may only obtain the data on part of the display since the conventional color analyzer measures closely against the center of the display. The conventional color analyzer cannot perform the correction based on the data of the whole area of the display. Therefore, the human eye may still perceive differently for different displays, even if the displays have been processed by the same correction method, since the human eye can generally sense the overall differences in colors.

SUMMARY OF THE DISCLOSURE

The disclosure is related to a method for matching a color temperature of a display and a system for implementing the method. The system adopts two kinds of color analyzers in an aspect. Specifically, a first color analyzer and a second color analyzer are incorporated.

In the system for matching the color temperature of the display, the first color analyzer is such as a conventional color analyzer that sets up a correction target of the display. In one of the embodiments, the first color analyzer is used to determine a first regional color value of a specific area of the display. The specific area is a central area near a center of the display panel of the display. The second color analyzer can be a 2D color analyzer that is used to determine a global color value of the display and also obtain a second regional color value of the specific area.

In one aspect of the method for matching a color temperature of a display having a correction target, a first difference between the first regional color value and the second regional color value is obtained. A second difference between the global color value and the second regional color value is obtained. A global color target value is introduced to adjust a correction target according to the first difference and the second difference. A new correction target is generated and is used to correct a display parameter of the display.

In another aspect of the disclosure, the new correction target is used to adjust gamma parameters and color transfer parameters of a color transfer matrix to be display parameters used to correct colors of the display.

Further, the new correction target is applied to the first color analyzer for adjusting color parameters of the specific area of the display so as to form firmware parameters that are applied to a display chip of the display.

In one aspect, the system obtains a new global color target value of the display in an offline mode for correcting the correction target of the display.

Furthermore, when the new global color target value in the offline mode is obtained, the method further provides multiple displays and determine a color value of the specific area of each of the displays by the first color analyzer. The second color analyzer is used to determine the global color value of each of the displays and the color value of the specific area of the display. For each of the displays, a difference of the color values of the specific area obtained from the first color analyzer and the second color analyzer is calculated. Another difference between a regional color value of the specific area and the global color value obtained by the second color analyzer, and obtaining a sum of the differences is calculated. After that, a global target value for each of the displays can be obtained by the second color analyzer according to the correction target setting of the specific area by the first color analyzer and the sum of the differences. An average value of the multiple displays based on the global target value for each of the displays, and obtaining the new global color target value is calculated.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
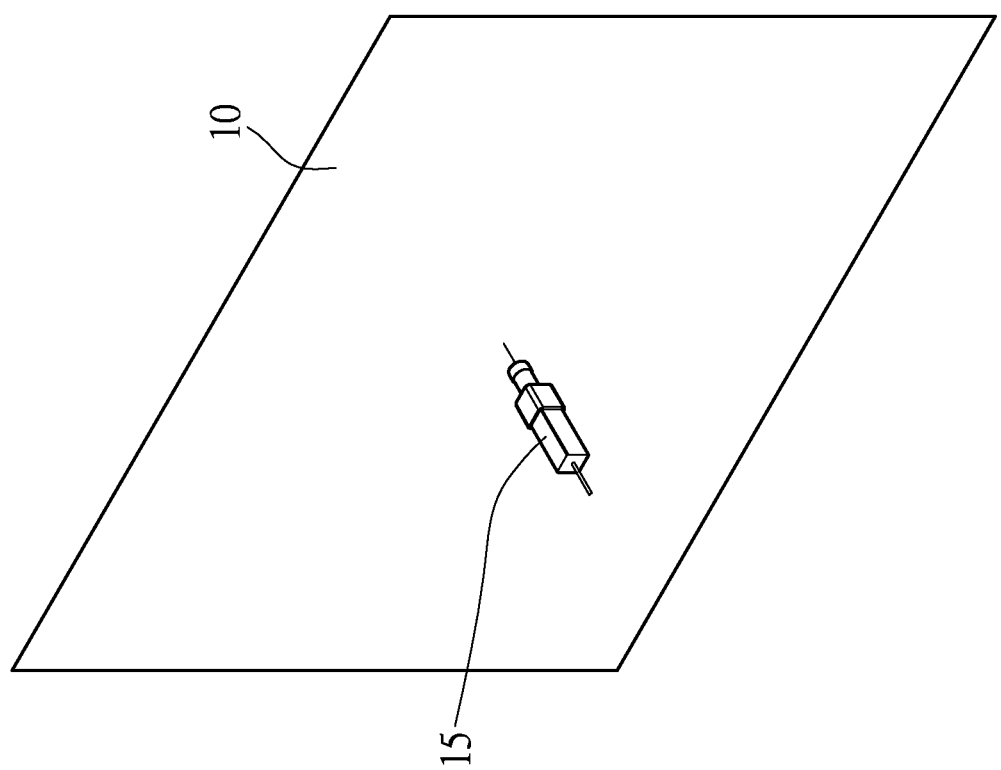
FIG. 1 is a schematic diagram depicting a first color analyzer in use according to one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is generally related to a method for matching a color temperature of a display and a system for implementing the method. The correction method is such as a color correction method applied to a flat panel display with an LED backlit. It is different from the conventional technology that only corrects the colors of a central area of the display while the display is shipped. In an aspect, the correction method of the disclosure uses Tristimulus values as target parameters to be corrected. In addition to the correction performed on the central or a part of the display, the other portions of the display are also considered in the method. The main measure of the method uses a two-dimensional (2D) color analyzer besides a conventional color analyzer. The conventional color analyzer can be referred to as a first color analyzer of the disclosure. The 2D color analyzer can be referred to as a second color analyzer that performs an auxiliary measurement in the method. In an exemplary example, the 2D color analyzer is used to measure the overall characteristics of the display. The overall characteristics of the display can be used to correct the conventional first color analyzer since the first color analyzer only measures the partial area of the display. Even though the display is corrected through the method using the conventional first color analyzer, the human eye may have different perceptions on different areas of the entire display, since there is a lacking of the global information.

The 2D color analyzer, i.e., the second color analyzer, can measure the effects affected by various viewing angles of different areas of the display and mixture of colors and brightness in different areas of the display. Therefore, the color information of the display obtained by the 2D color analyzer is much more similar to the human eye perception. Therefore, the color information can only be referred to as part of the area for correcting the data measured by the first color analyzer. However, the 2D color analyzer spends more time to conduct the measurement than the conventional color analyzer because the 2D color analyzer is used to measure the whole area of the display. The method for matching the color temperature of the display of the disclosure uses the measurements made by both the first color analyzer and the second color analyzer and allows the first and the second color analyzers to make up for the respective defects relating to the measurement area and measurement time.

The system implementing the method for matching the color temperature of the display includes a first color analyzer and a second color analyzer. The first color analyzer can be a conventional analyzer that is used to determine the color information of a central or a specific area of the display. The first color analyzer can be, but not limited to, a KONICA MINOLTA CA-310 color analyzer. The second color analyzer is preferably used to determine the color information of a whole area of the display. The second color analyzer can be, but not limited to, a KONICA MINOLTA CA-2000 color analyzer that is designed to be a 2D color analyzer.

According to one of the embodiments of the disclosure, the first color analyzer 15, as shown in FIG. 1, is disposed in front of a display panel of a display 10. The display 10 is such as a liquid-crystal display (LCD) being mounted with an LED backlight module. The first color analyzer 15 is used to measure the color information of a central area or any specific area of the display 10. A predetermined correction target set for the display 10 by the first color analyzer 15 allows the system to tune an overall performance of the pixels within the specific area of the display. The performance of the pixels relates to the parameters such as chromaticity and luminance. The color information relates to brightness/luminance characteristics that can be represented by a gamma curve. The chromaticity can be the parameters being adjusted by the first color analyzer 15. The parameters can be derived from red (R), green (G), and blue (B) colors and are such as Tristimulus values defined in a CIE 1931 color space.

Figure 2:
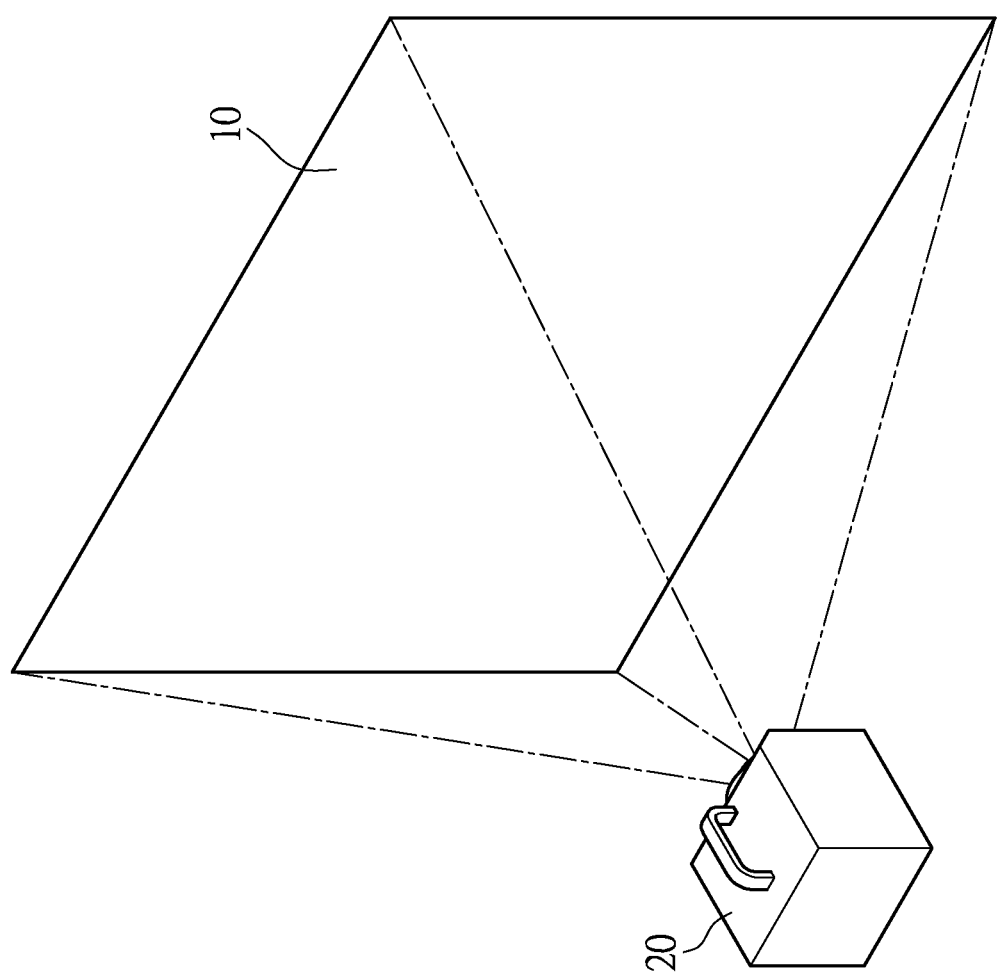
FIG. 2 is a schematic diagram depicting a second color analyzer in use according to one embodiment of the disclosure.

Reference is made to FIG. 2, which shows a schematic diagram depicting a two-dimensional color analyzer adopted by the method for matching the color temperature of the display of the disclosure. A second color analyzer 20 such as a 2D color analyzer is shown in the diagram. The second color analyzer 20, rather than the first color analyzer 15, captures or scans the color information of a whole area of the display 10 from a distance.

Figure 3:
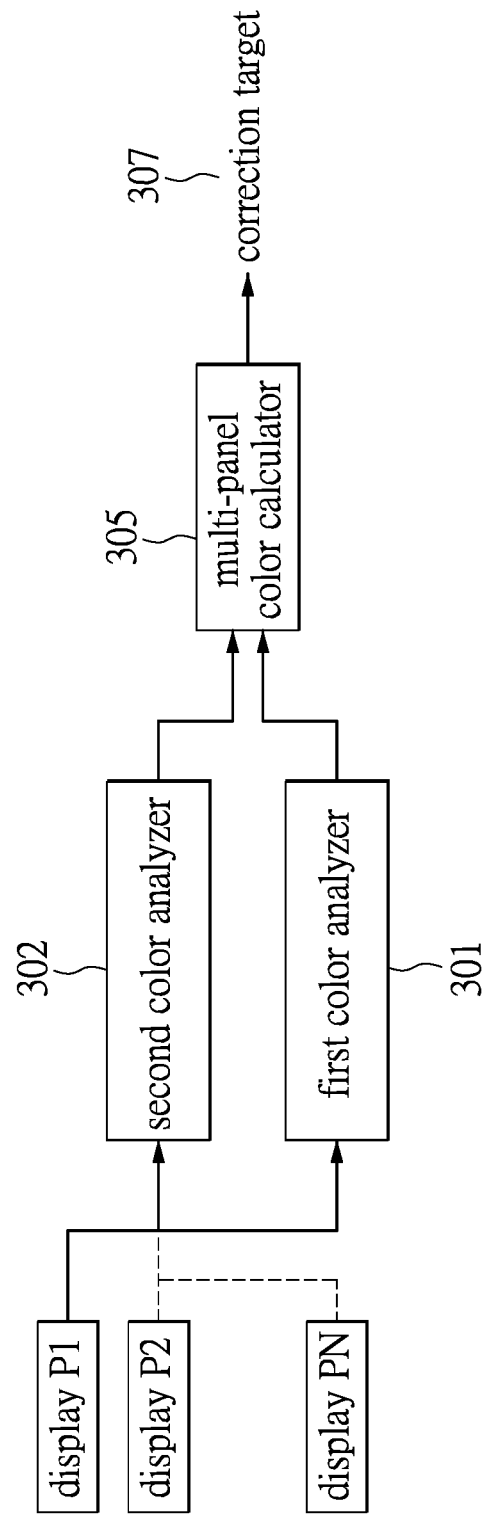
FIG. 3 is a schematic diagram depicting a system obtaining a correction target in an offline mode in one embodiment of the disclosure.
Figure 4:
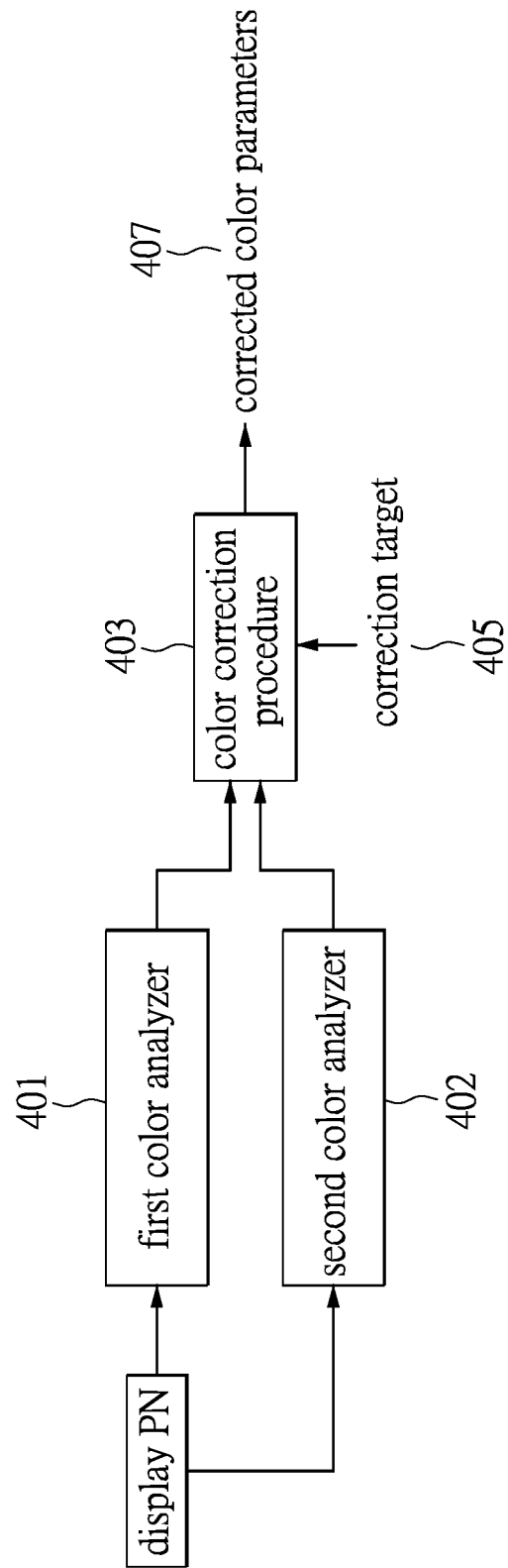
FIG. 4 is a schematic diagram depicting the system obtaining corrected color parameters in an online mode in one further embodiment of the disclosure.

The system for matching the color temperature of the display employs the first color analyzer and the second color analyzer to operate in an offline mode or an online mode. The offline mode determines a target of perception for the human eye. The online mode allows the system to perform correction for each display based on the target of perception of the same person. FIG. 3 and FIG. 4 depict the two modes respectively.

FIG. 3 is a schematic diagram depicting the system obtaining a correction target in the offline mode according to one embodiment of the disclosure. At least two displays, e.g., display P1, P2, . . . , and PN, are shown in the diagram. The displays can be supplied by different manufacturers. A first color analyzer 301 and a second color analyzer 302 captures images of one of the displays P1, P2, . . . , and PN, and obtain the color information respectively. A multi-panel color calculator 305 is used to calculate a correction target 307.

In the present embodiment, a color value of a specific area of each of the displays P1, P2, . . . , and PN can be obtained by the first color analyzer 301. The specific area can be a central area around a center of the display. The first color analyzer 301 or the second color analyzer 302 performs a color analysis for sampling a white color from the CIE 1931 xyY color space. A "W" value of the equation indicates the color information converted from a color temperature of white color at 'x' and 'y' of the CIE 1931 color space.

In an exemplary example, referring to 6500K sunlight at x=0.313, y=0.329 of the CIE 1931 xyY color space, the color temperature can be obtained by capturing or scanning the white color in the xyY color space. A conversion equation 1 of color temperature and color value is used to calculate a color value. A general white sampling value can be found in the xyY color space. One of the objectives of the conversion equation 1 is to convert a white color temperature target to the xyY color space. The white color of the correction target indicates a perception of the human eye. The perception of the human eye can then be converted to a numerical value. For calibrating the inconsistent perceptions of the human eye, conversion equation 1 converts the white color of correction target into the xyY color space for calculating a new correction target. The color values of the specific area of the displays P1, P2, . . . , and PN can be represented by $W_{c\_CA\_P1}$, $W_{c\_CA\_P2}$, . . . , and $W_{c\_CA\_PN}$. The second color analyzer 302 is such as the 2D color analyzer. The second color analyzer 302 obtains the color values of the whole area of each of the displays P1, P2, . . . , and PN. The color values can also be obtained from the color temperature of the whole area of the displays by equation 1. The color value of the whole area of the display can be expressed as a global color value. In the meantime of obtaining the global color value, the color values of the specific area of the displays can also be obtained by the second color analyzer. While obtaining the global color values $W_{p\_2D\_CA\_P1}$, $W_{p\_2D\_CA\_P2}$, . . . , and $W_{p\_2D\_CA\_PN}$ of every display, the color values of the specific area obtained by the first color analyzer 301 can be corrected.

Equation 1 shows the equation for converting the color temperature into the color values x, y in the CIE 1931 xyY color space.

$$x = \begin{cases} \frac{-4.6070 \times 10^9}{T^3} + \frac{2.9678 \times 10^6}{T^2} + \\ \frac{0.09911 \times 10^3}{T} + 0.244063, \\ \text{if } 4000K \leq T \leq 7000K \\ \frac{-2.0064 \times 10^9}{T^3} + \frac{1.9018 \times 10^6}{T^2} + \\ \frac{0.24748 \times 10^3}{T} + 0.237040, \\ \text{if } 7000K \leq T \leq 25000K \end{cases}$$
$$y = -3 \times x^2 + 2.87 \times x - 0.275$$

Equation 1

In an aspect of the disclosure, both the first color analyzer 301 and the second color analyzer 302 determine the regional color value of the specific area of each of the displays P1, P2, . . . , and PN. The regional color values of the displays are $W_{c\_CA\_P1}$, $W_{c\_CA\_P2}$, . . . , and $W_{c\_CA\_PN}$. The second color analyzer 302 also obtains the global color value of each of the displays P1, P2, and PN, and the values are $W_{p\_2D\_CA\_P1}$, $W_{p\_2D\_CA\_P2}$, . . . , and $W_{p\_2D\_CA\_PN}$. A correction target ($W_{c\_CA\_target}$) of equation 1 is originally provided for the first color analyzer 301.

In the correction method, the correction target ($W_{c\_CA\_target}$) is provided for obtaining a new correction target ($W_{p\_2D\_CA\_new\_target}$) 307 according to equation 2 performed by a multi-panel color calculator 305.

In equation 2, e.g., for the display P1, a color value ($W_{c\_2D\_CA\_P1}$) of a specific area, e.g., the central area, of the display P1 is obtained by the second color analyzer 302, another color value ($W_{c\_CA\_P1}$) of the same area of the display P1 is obtained by the first color analyzer 301, and a difference ($W_{c\_2D\_CA\_P1} - W_{c\_CA\_P1}$) between the two color values ($W_{c\_2D\_CA\_P1}$, $W_{c\_CA\_P1}$) is calculated. Further, a global color value ($W_{p\_2D\_CA\_P1}$) of the display P1 is obtained by the second color analyzer 302, the regional color value ($W_{c\_2D\_CA\_P1}$) of a specific area of the display P1 is obtained by the second color analyzer 302, and another difference ($W_{p\_2D\_CA\_P1} - W_{c\_2D\_CA\_P1}$) between the two color values ($W_{p\_2D\_CA\_P1}$, $W_{c\_2D\_CA\_P1}$) is calculated. A sum $((W_{c\_2D\_CA\_P1} - W_{c\_CA\_P1}) + (W_{p\_2D\_CA\_P1} - W_{c\_2D\_CA\_P1}))$ of the differences is then calculated. Further, the correction target ($W_{c\_CA\_target}$) specified by the first color analyzer for the specific area is then added to the sum. A global target value ($W_{p\_2D\_CA\_P1\_target}$) of the display P1 can be obtained by the second color analyzer 302.

$$W_{p\_2D\_CA\_P1\_target} = W_{c\_CA\_target} + (W_{c\_2D\_CA\_P1} - W_{c\_CA\_P1}) + (W_{p\_2D\_CA\_P1} - W_{c\_2D\_CA\_P1}).$$

Equation 2:

In equation 2, the global target value ($W_{p\_2D\_CA\_P2\_target}$) of the display P2 can also be obtained by the second color analyzer 302 until the global target value ($W_{p\_2D\_CA\_PN\_target}$) of the display PN can be obtained.

In a multi-panel color calculator 305, such as equation 3, the second color analyzer 302 is used to obtain the global target values of the displays P1, P2, . . . , and PN. A sum of the global target values ($W_{p\_2D\_CA\_P1\_target} + W_{p\_2D\_CA\_P2\_target} + \cdots + W_{p\_2D\_CA\_PN\_target}$) is calculated. An average value is calculated when the sum is divided by numeral 'N'. The average value is a new global color target value ($W_{p\_2D\_CA\_new\_target}$) for the second color analyzer 302, i.e., the final correction target 307 of FIG. 3.

$$W_{p\_2D\_CA\_new\_target} = (W_{p\_2D\_CA\_P1\_target} + W_{p\_2D\_CA\_P2\_target} + \cdots + W_{p\_2D\_CA\_PN\_target})/N.$$

Equation 3:

After obtaining the correction target under the offline mode of the system, the system enters the online mode for obtaining the corrected color parameters as shown in FIG. 4 of the disclosure.

In an exemplary example of equation 3, when the new global color target value ($W_{p\_2D\_CA\_new\_target}$) is obtained under the offline mode of the system, each of the displays P1, P2, . . . , and PN can calculate its own correction target (307 of FIG. 3) for color analysis of the display based on the new global color target value ($W_{p\_2D\_CA\_new\_target}$). After that, as shown in FIG. 4, the color values obtained by the different color analyzers (401 and 402) for the specific area or the whole area respectively are inputted to a color correction procedure 403. A correction target 405 calculated by equation 3 is also introduced for obtaining a corrected color parameters 407. The corrected color parameters 407 are provided as the display parameters used for driving the display PN.

With the display PN as an example, a first color analyzer 401 measures a regional color value ($W_{c\_CA\_PN}$) with respect to a specific area of the display PN. The specific area is such as a central area that is generally used to represent the color information of the display PN. The system for matching the color temperature of the display uses the second color analyzer 402 to measure a global color value ($W_{p\_2D\_CA\_PN}$) of a whole area of the display PN. The first color analyzer 401 is such as a conventional color analyzer and the second color analyzer 402 is such as a 2D color analyzer.

Next, the global color value can be converted to the regional color value ($W_{c\_2D\_CA\_PN}$) of a specific area of the display. The regional color value ($W_{c\_2D\_CA\_PN}$) is the color value of the specific area from the global color value measured by the second color analyzer 402. In the meantime, the system introduces the correction target 405 obtained under the offline mode in the color correction procedure 403 for obtaining the new global color target value ($W_{p\_2D\_CA\_new\_target}$) in equation 3.

Figure 5:
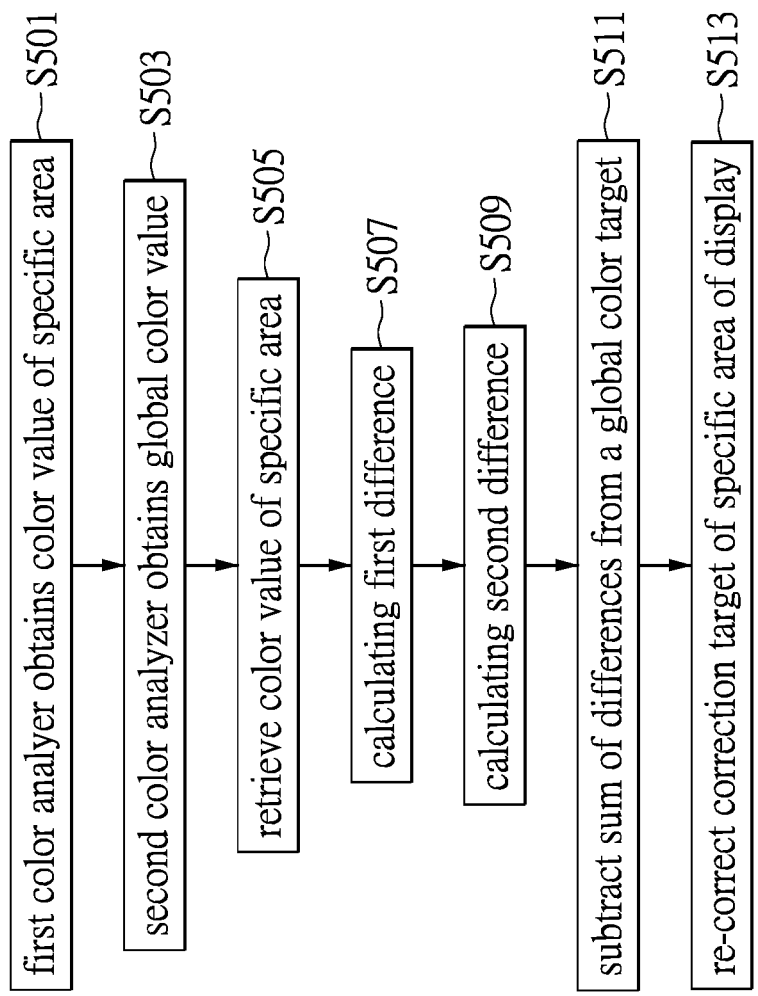
FIG. 5 shows a flow chart of the method for matching a color temperature of a display in one embodiment of the disclosure.

In the color correction procedure 403, equation 4 is performed for introducing the global color target value ($W_{p\_2D\_CA\_new\_target}$) and also the color values including the global color value obtained by the second color analyzer 402 and the regional color value obtained by the first color analyzer 401. The correction target (originally $W_{c\_CA\_target}$) for every display is modified for obtaining the new correction target ($W_{c\_CA\_PN\_target}$). The related correction parameters are used to tune the parameters such as the pre gamma, the color transfer matrix, and the post gamma that allows the human eye to perceive the same display effect of the color space and the display. The display effect perceived by the human eye is such as white balance.

$$W_{c\_CA\_PN\_target} = W_{p\_2D\_CA\_new\_target} - ((W_{c\_2D\_CA\_PN} - W_{c\_CA\_PN}) + (W_{p\_2D\_CA\_PN} - W_{c\_2D\_CA\_PN})).$$ Equation 4:

Equation 4 describes a process for obtaining the color target of a specific area of the display PN. In an embodiment of the disclosure, the related method for matching the color temperature of the display is described in the flow chart of FIG. 5.

In the color correction procedure, the first color analyzer is used to measure a regional color value ($W_{c\_CA\_PN}$) for the specific area of the display PN. The regional color value ($W_{c\_CA\_PN}$) can be named a first regional color value (step S501). On the other hand, the second color analyzer is used to measure a global color value ($W_{p\_2D\_CA\_PN}$) of the display PN (step S503). A second regional color value ($W_{c\_2D\_CA\_PN}$) can be determined from the global color value in the same specific area mentioned in step S501. The color value of the specific area is measured by the second color analyzer (step S505). The color value of the specific area can still be distinct from the first regional color value ($W_{c\_CA\_PN}$) obtained by the first color analyzer. The second regional color value can be obtained based on a ratio of the global color value via a specific algorithm, the size of the display panel, and the size of the specific area obtained by the first color analyzer.

In the meantime, a first difference ($W_{c\_2D\_CA\_PN} - W_{c\_CA\_PN}$) between the first regional color value of the same specific area obtained by both the first and second color analyzers is calculated (step S507), and a second difference ($W_{p\_2D\_CA\_PN} - W_{c\_2D\_CA\_PN}$) between the global color value of the display PN and the second regional color value obtained by the second color analyzer is calculated (step S509).

After that, a relationship between the first difference and the second difference is obtained. For example, a sum of the first difference and the second difference is used to adjust the correction target set for the display by the first color analyzer so as to generate a new correction target. The new correction target is used to correct the display parameters for driving the display.

With the summation of the first difference and the second difference as an example, the global color target value ($W_{p\_2D\_CA\_new\_target}$) obtained by equation 3 subtracts the sum of the first difference and the second difference (step S511) for re-modifying the correction target ($W_{c\_CA\_PN\_target}$) of the specific area of the display PN (step S513). The new correction target will be adapted to the first color analyzer in order to tune the color parameters for the specific area of the display. The color parameters being tuned are such as the gamma parameters and the color transfer parameters used in the color transfer matrix. Finally, the firmware parameters applied to the display chip of the display PN are used to modify the color performance such as the chromaticity and the luminance for the display.

Thus, the method for matching the color temperature of the display obtains a new correction target that allows the first color analyzer to adjust the Tristimulus values so that the human eye can be adjusted to the color target desired by the manufacturer. In addition to the area around the center of the display panel of the display, the color deviation of the surrounding part of the display is also improved. The purpose of the system is to allow users to see images with consistent colors across the display.

According to the above embodiments of the disclosure, the global color value of the whole area of the display and the regional color value of the specific area of the display can be any color information within any color space. The methods described in the embodiments are not intended to limit the scope of the present disclosure.

In conclusion, the system for matching the color temperature of the display achieves a correction method that determines the global color information of the display by the 2D color analyzer and determines the regional color information by the conventional color analyzer for allowing the human eye to have the same perception as the target color space and the display. As compared to the conventional color correction device that is used to correct part of the display, for example, the central area is where human vision is often focused on, but instead, the correction method of the disclosure considers the whole area of the display for the human vision and not just the specific area. The system employs an additional color analyzer such as the 2D color analyzer. The method provides a new correction procedure for solving the problem that the 2D color analyzer spends more time to measure the color information than the conventional color analyzer. The shortcomings of the conventional color analyzer can be compensated for re-modifying the correction target set for every display. The correction method can maintain the original color performance of the specific area and cause the human eye to have the same or close to the same perception of the color temperature and colors of the overall display.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for matching a color temperature of a display, comprising:
    a first color analyzer configured for determining a first regional color value of a specific area of the display, the first color analyzer setting up a correction target of the display; and
    a second color analyzer configured for determining a global color value of a whole area of the display and a second regional color value of the specific area of the display;
    wherein a first difference between the first regional color value and the second regional color value and a second difference between the global color value and the second regional color value are obtained, and a new global color target value is introduced for adjusting the correction target of the display, wherein the first difference and the second difference are added to obtain a sum of differences and the sum is subtracted from the new global color target value for generating a new correction target for correcting display parameters of the display.

2. The system according to claim 1, wherein the specific area of the display is a central area near a center of the display panel of the display.

3. The system according to claim 1, wherein a color analysis process performed by the first color analyzer or the second color analyzer is to sample white colors of a color space, obtain information of the color temperature by capturing images of the specific area or the whole area of the display, and calculate the corresponding color information through a conversion equation between the color temperature and the color value.

4. The system according to claim 1, wherein the new correction target is for adjusting gamma parameters and color transfer parameters of a color transfer matrix to be display parameters for correcting colors of the display.

5. The system according to claim 4, wherein the new correction target is applied to the first color analyzer for adjusting color parameters of the specific area of the display so as to form firmware parameters that are applied to a display chip of the display.

6. The system according to claim 1, wherein the system obtains the new global color target value of the display in an offline mode for correcting the correction target of the display.

7. The system according to claim 6, wherein the steps for obtaining the new global color target value in the offline mode includes:
    providing multiple displays, determining by the first color analyzer the color value of the specific area of each of the displays;
    determining by the second color analyzer the global color value of each of the displays and the color value of the specific area of the display;
    for each of the displays, calculating a difference of the color values of the specific area obtained from the first color analyzer and the second color analyzer, and another difference between a regional color value of the specific area and the global color value obtained by the second color analyzer, and obtaining the sum of the differences;
    obtaining a global target value for each of the displays by the second color analyzer according to a correction target setting of the specific area by the first color analyzer and the sum of the differences; and
    calculating an average value of the multiple displays based on the global target value for each of the displays, and obtaining the new global color target value.

8. A method for matching a color temperature of a display having a correction target and operating in an online mode to obtain a new global color target value of the display based on an offline mode, and the new global color target value being used for correction of the correction target of the display, wherein the method comprises:
    determining by a first color analyzer a first regional color value of a specific area of the display;
    determining by a second color analyzer a global color value of a whole area of the display;
    obtaining a second regional color value of the specific area of the display according to the global color value;
    obtaining a first difference between the first regional color value and the second regional color value and a second difference between the global color value and the second regional color value; and
    introducing the new global color target value for adjusting the correction target of the display, wherein the first difference and the second difference are added to obtain a sum of differences and the sum is subtracted from the new global color target value for generating a new correction target for correcting display parameters of the display.

9. The method according to claim 8, wherein, when the new global color target value in the offline mode is obtained, further comprising:
    providing multiple displays, determining by the first color analyzer the color value of the specific area of each of the displays;
    determining by the second color analyzer the global color value of each of the displays and the color value of the specific area of the display;
    for each of the displays, calculating a difference of the color values of the specific area obtained from the first color analyzer and the second color analyzer, and another difference between a regional color value of the specific area and the global color value obtained by the second color analyzer, and obtaining the sum of the differences;

obtaining a global target value for each of the displays by the second color analyzer according to a correction target setting of the specific area by the first color analyzer and the sum of the differences; and calculating an average value of the multiple displays based on the global target value for each of the displays, and obtaining the new global color target value.

10. The method according to claim 8, wherein the correction target and the new correction target uses Tristimulus values as target parameters to be corrected.

11. The method according to claim 8, wherein the specific area of the display is a central area near a center of the display panel of the display.

12. The method according to claim 8, wherein, a color analysis process performed by the first color analyzer or the second color analyzer is to sample white colors of a color space, obtain information of the color temperature by capturing images of the specific area or the whole area of the display, and calculate the corresponding color information by a conversion equation between the color temperature and the color value.

13. The method according to claim 12, wherein the step for obtaining the new global color target value in the offline mode includes:

providing multiple displays, determining by the first color analyzer the color value of the specific area of each of the displays;

determining by the second color analyzer the global color value of each of the displays and the color value of the specific area of the display;

for each of the displays, calculating a difference of the color values of the specific area obtained from the first color analyzer and the second color analyzer, and another difference between a regional color value of the specific area and the global color value obtained by the second color analyzer, and obtaining the sum of the differences;

obtaining a global target value for each of the displays by the second color analyzer according to a correction target setting of the specific area by the first color analyzer and the sum of the differences; and calculating an average value of the multiple displays based on the global target value for each of the displays, and obtaining the new global color target value.

14. The method according to claim 8, wherein the new correction target is for adjusting gamma parameters and color transfer parameters of a color transfer matrix to be display parameters for correcting colors of the display.

15. The method according to claim 14, wherein the new correction target is applied to the first color analyzer for adjusting color parameters of the specific area of the display so as to form firmware parameters that are applied to a display chip of the display.

16. The method according to claim 15, wherein the step for obtaining the new global color target value in the offline mode includes:

providing multiple displays, determining by the first color analyzer the color value of the specific area of each of the displays;

determining by the second color analyzer the global color value of each of the displays and the color value of the specific area of the display;

for each of the displays, calculating a difference of the color values of the specific area obtained from the first color analyzer and the second color analyzer, and another difference between a regional color value of the specific area and the global color value obtained by the second color analyzer, and obtaining the sum of the differences;

obtaining a global target value for each of the displays by the second color analyzer according to a correction target setting of the specific area by the first color analyzer and the sum of the differences; and calculating an average value of the multiple displays based on the global target value for each of the displays, and obtaining the new global color target value.

\* \* \* \* \*